United States Patent [19]

Metzger

[11] 4,272,806
[45] Jun. 9, 1981

[54] DC TO DC CONVERTER ADJUSTABLE DYNAMICALLY TO BATTERY CONDITION

[75] Inventor: Lenard M. Metzger, Rochester, N.Y.

[73] Assignee: Eastman Kodak Company, Rochester, N.Y.

[21] Appl. No.: 47,530

[22] Filed: Jun. 8, 1979

[51] Int. Cl.³ .................. H05B 41/32; H02M 3/335; H02J 7/00
[52] U.S. Cl. .................. 363/21; 315/241 P; 320/39; 323/906; 363/80
[58] Field of Search .............. 320/1, 39, 40; 315/219, 315/241 R, 241 P, 225, 239, 362; 323/15, 17, DIG. 1; 363/18–21, 80, 97, 124

[56] References Cited

U.S. PATENT DOCUMENTS

| | | | |
|---|---|---|---|
| 3,541,420 | 11/1970 | Rees | 323/4 |
| 3,588,672 | 6/1971 | Wilson | 323/4 |
| 3,590,361 | 6/1971 | Bishop et al. | 363/21 |
| 3,846,690 | 11/1974 | Colyn | 320/1 |
| 3,938,021 | 2/1976 | Kosmin | 320/40 |
| 4,070,699 | 1/1978 | Einbinder | 363/20 X |
| 4,084,103 | 4/1978 | Burns et al. | 363/124 X |
| 4,104,714 | 8/1978 | Smith et al. | 363/21 |
| 4,124,884 | 11/1978 | Episcopo | 363/21 |

Primary Examiner—A. D. Pellinen
Attorney, Agent, or Firm—D. P. Monteith

[57] ABSTRACT

A battery-powered DC to DC converter is operated dynamically in accordance with the condition of the battery so that an optimum compromise is made between the performance of the battery and the performance of the converter in an application such as charging an electronic strobe flash unit capacitor. A transformer has oppositely wound primary and secondary windings. A switching transistor, serially connected between the primary winding and the battery, interrupts battery current through the primary winding, which causes current to flow through the secondary winding to charge the flash unit capacitor. A voltage-sensing circuit senses the battery open-circuit voltage and the battery load voltage, which varies as a function of the open-circuit voltage and battery internal resistance. A bistable control circuit causes the switching transistor to interrupt the primary winding current when the battery load voltage decreases below a predetermined percentage of the battery open-circuit voltage so the load that the converter places on the battery varies dynamically as a function of battery condition.

6 Claims, 5 Drawing Figures

DC TO DC CONVERTER ADJUSTABLE DYNAMICALLY TO BATTERY CONDITION

BACKGROUND OF THE INVENTION

1. Field of the Invention

This invention relates to a battery-powered DC to DC converter for charging an energy-storage capacitor. More particularly, this invention relates to a DC to DC converter which is operated dynamically as a function of battery condition so that an optimum compromise is made between the performance of the battery and the performance of the converter in an application such as charging an electronic strobe flash unit capacitor.

2. Description of the Prior Art

The electrical energy a battery delivers to a load equals battery power (battery voltage times battery current) multiplied by the time during which that power is delivered. A battery has a certain energy-delivery capacity. This capacity is not constant, and is a function of battery loading and other factors such as temperature. If battery voltage is halved and battery current is doubled, the battery's total energy-delivered capacity can change, even though battery power is the same. An excessively loaded battery, i.e. a battery whose current is increased beyond a particular level, can suffer a significant decrease in its total energy-delivery capacity.

As the condition of the battery changes due, for example, to aging or to changes in environment, the peak current that it can supply, without being excessively loaded, changes. It is desirable, therefore, that the battery load be adjusted in accordance with battery condition so that an optimum compromise is made between the performance of the battery and the performance of its load.

In a battery-powered electronic strobe flash unit, a flash-firing capacitor is charged to a voltage of approximately 300 volts so that the strobe can be fired. To charge the capacitor to this level using a low-voltage battery, the strobe unit includes a DC to DC converter. For a 6-volt battery, a conventional DC to DC converter for an electronic strobe flash unit can require a peak current greater than an ampere for a fraction of a second and an average current of about 750 milliamperes for 10 seconds or more.

There are two somewhat conflicting requirements that govern the construction and operation of a DC to DC converter for an electronic strobe flash unit. Firstly, it is desirable that the converter operate to charge the flash-firing capacitor quickly. This permits a camera operator to take a rapid sequence of flash exposures. However, if the capacitor is charged as quickly as possible the battery can be overloaded, thereby reducing its total energy-delivery capacity.

Secondly, it is desirable to transfer electric energy from the battery to the flash-firing capacitor efficiently. This permits a greater number of flashes to be produced before the battery is exhausted. However, if the converter is operated solely on the basis of high power-transfer efficiency, the transfer of power from the battery to the capacitor can occur at a slow rate, so that the time required to charge the capacitor can be excessive.

U.S. Pat. No. 4,104,714, issued to Smith et al on Aug. 1, 1978, describes a DC to DC "flyback" converter that is intended to operate so that maximum power is transferred from the battery to an energy-storage capacitor. The flyback converter includes a first current-sensing circuit for sensing battery current to a transformer, and for interrupting the battery current when it reaches a predetermined magnitude. The transformer stores energy when battery current is supplied to the transformer, and the transformer delivers its stored energy to the energy-storage capacitor in the form of a charging current when battery current to the transformer is interrupted. A second current-sensing circuit monitors the current charging the capacitor, and inhibits further battery current to the transformer until the energy stored in the transformer has been delivered to the storage capacitor. A battery voltage-sensing circuit then continues the interruption of the battery current if the battery open-circuit voltage has not recovered to a predetermined level.

An arrangement of the type described in the '714 patent can require an excessive amount of time to charge the storage capacitor. For example, as the battery ages, its open-circuit voltage may not recover quickly to the aforementioned predetermined level. As a result, the duty cycle of the converter can decrease to a point where the capacitor charging time is unacceptably long. Furthermore, if the internal resistance by the battery increases as the battery's condition changes, the battery may not be able to supply a current of a magnitude that causes the first current-sensing circuit to interrupt current flow. In this case, the converter will attempt to draw energy from the battery that it cannot supply, thereby possibly permanently damaging the battery.

U.S. Pat. No. 4,070,699, issued to H. M. Einbinder on Jan. 24, 1978, describes a flyback converter that is intended both to minimize capacitor charging time and to provide optimum battery use. The converter includes control circuitry that allows only minor changes in the magnetic field of the transformer, both when the battery current flows and when it is interrupted. With this arrangement, the battery current is maintained approximately constant whenever it flows.

A converter of the type described in the '699 patent must operate at a high frequency for the battery current to approach a constant. As a result, frequency-dependent factors such as transition losses in the transformer core reduce power transfer efficiency. Furthermore, the control circuitry does not operate the converter dynamically, i.e. it does not compensate for changes in the condition of the battery.

SUMMARY OF THE INVENTION

According to the present invention, a DC to DC converter is operated dynamically as a function of the condition of an energizing battery, so that an optimum compromise is made between the performance of the battery and the performance of the converter in an application such as charging an electronic strobe flash unit capacitor.

The converter comprises a transformer having a first winding and a second winding, and a switch connected in series with the first winding and the energizing battery. The switch interrupts battery current in the first winding to cause current to flow in the second winding.

Voltage-sensing means, coupled to the battery, senses (1) the battery open-circuit voltage when battery current to the first winding is interrupted, and (2) the battery load voltage when battery current flows to the first winding. The battery load voltage is directly proportional to the battery open-circuit voltage, and is inversely proportional to the battery internal resistance. Comparator means, coupled between the voltage-sensing means and the switch, compares the battery open-circuit voltage with the battery load voltage. When the battery load voltage decreases below a predetermined percentage of the battery open-circuit voltage, the comparator causes the switch to interrupt battery current to the first winding. With this arrangement, the energy drawn from the battery when battery current flows to the first winding varies with the condition of the battery in direct proportion of the open-circuit voltage and in inverse proportion to the internal resistance of the battery.

The invention, and its advantages, will become more apparent in the detailed description of a preferred embodiment presented below.

DESCRIPTION OF THE DRAWINGS

The invention will be described with reference to the accompanying drawings, wherein.

DESCRIPTION OF A PREFERRED EMBODIMENT

Because battery-powered DC to DC converters are well known, the present description will be directed in particular to elements forming part of, or cooperating directly with, apparatus in accordance with the present invention. It is to be understood that elements not specifically shown or described can take various forms well known to those having skill in the DC to DC converter art.

The term "battery open-circuit voltage" as used herein shall means and refer to the terminal voltage of the battery when battery current to the converter is interrupted, and the term "battery load voltage" as used herein shall mean and refer to the battery terminal voltage when battery current is being supplied to the converter. The battery load voltage equals the battery open-circuit voltage minus any voltage drop internal to the battery. This internal voltage drop equals the internal resistance of the battery multiplied by the battery current supplied to the converter.

Figure 1:
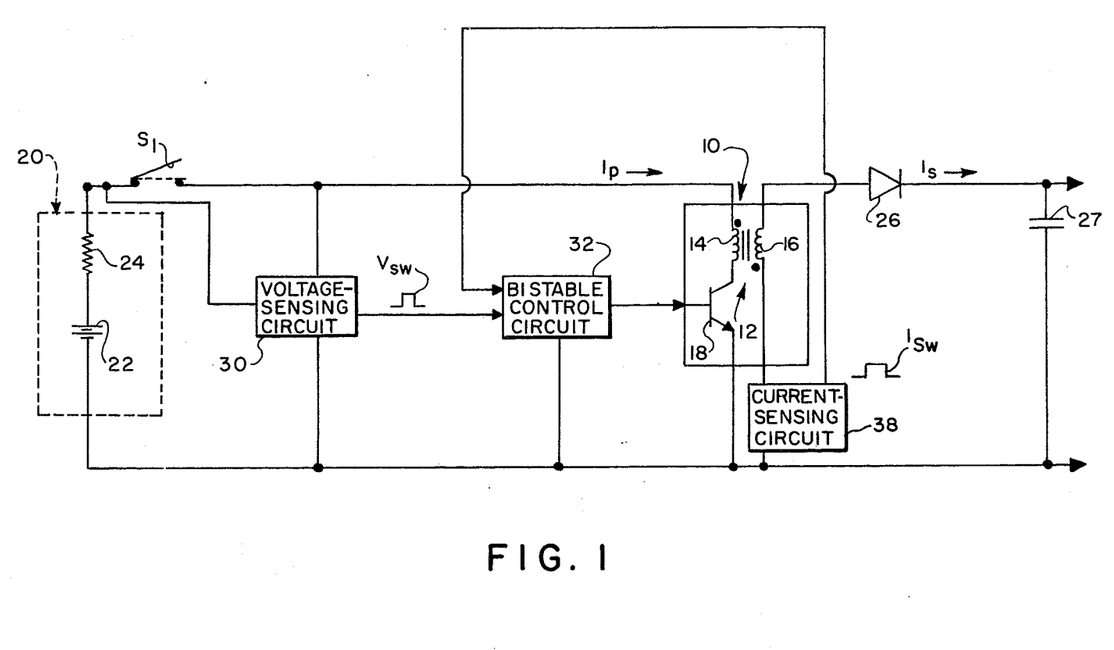
FIG. 1 is a block diagram of a battery-powered DC to DC converter according to the invention.

There is shown in FIG. 1 a DC to DC converter 10 of the type known in the art as a ringing choke converter or flyback converter. The converter 10 includes a transformer 12 having oppositely wound primary and secondary windings 14 and 16, respectively. A power-switching transistor 18 is connected in series to the primary windng 14, a switch $S_1$, and a low-voltage battery 20. As shown, the battery 20 is represented as having an open-circuit voltage, identified by the numeral 22, and an effective internal resistance, identified by the numeral 24. A diode 26 is connected in series to the secondary winding 16 for conducting a rectified charging current to charge a high-voltage capacitive load 27.

The flyback converter 10 is constructed and arranged to charge the capacitor 27 to a maximum voltage of approximately 330 volts from the low-voltage battery 20, which may have a maximum battery open-circuit voltage 22 of approximately 6 volts.

The flyback converter 10 stores energy in the transformer 12 when the power-switching transistor 18 is conducting, and the converter transfers stored energy from the transformer to the capacitor 27 when the transistor is not conducting. It is useful to describe the structure and operation of the flyback converter 10 in terms of "an energy storage cycle" and "an energy transfer cycle." The term "energy storage cycle" as used herein shall mean and refer to the interval during which the transistor 18 is conducting whereby current flows from the battery 20 through the primary winding 14 of the transformer 12. The term "energy transfer cycle" as used herein shall mean and refer to the interval during which the switch $S_1$ is closed, but the transistor 18 is not conducting, whereby battery current to the primary winding 14 is interrupted. During the energy transfer cycle, current flows through the secondary winding 16 and the diode 26, and the current charges the capacitor 27. An energy transfer cycle immediately follows the preceding energy storage cycle. A single period of operation of the converter 10 is the duration of one energy storage cycle, plus the duration of the immediately following energy transfer cycle. The converter 10 operates at an instantaneous frequency which is the reciprocal of its period.

Briefly described, the flyback converter 10 operates as follows. Assume that the switch $S_1$ is closed and the transistor 18 is conducting. Therefore, current $I_P$ flows from the battery 20 through the primary winding 14 and the transistor 18, which is quickly driven into saturation. When this occurs, ignoring the resistance of the primary winding 14 and the saturation voltage of the transistor 18, the current $I_P$ increases exponentially with time towards the battery short-circuit current, which equals the battery open-circuit voltage 22 divided by the battery internal resistance 24. The current $I_P$ induces a magnetic field in the core of the transformer 12 that is proportional to $I_P$. As long as the core is not magnetically saturated, the current $I_P$ and the magnetic field increase exponentially with a time constant equal to the inductance of the primary winding 14 divided by the resistance of the primary winding circuit including the battery internal resistance 24. For a time interval that is short relative to this time constant, it can be assumed that the current $I_P$ increases approximately linearly, as is shown in FIG. 2(b).

Figure 2A:
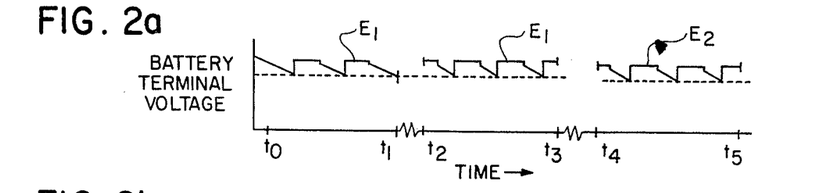
FIG. 2 illustrates signal waveforms which exist at various points in the block diagram of FIG. 1, and at various points in the circuit diagram of FIG. 5.
Figure 2B:
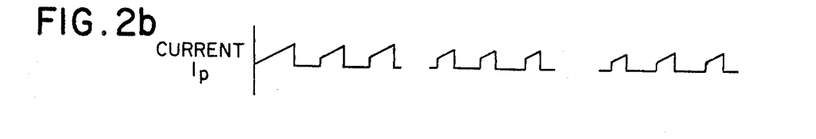

Because of the battery internal resistance 24, the battery load voltage decreases in proportion to $I_P$, as is shown in FIG. 2(a). A voltage-sensing circuit 30 senses when the battery load voltage decreases to a predetermined percentage of the battery open-circuit voltage 22, and, in response thereto, produces a voltage pulse $V_{SW}$, shown in FIG. 1 and in FIG. 2(d). The pulse $V_{SW}$ causes a bistable control circuit 32 to switch the transistor 18 OFF, thereby interrupting the current $I_P$ and terminating an energy storage cycle.

Figure 2C:
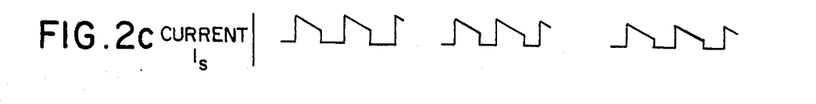
Figure 2D:
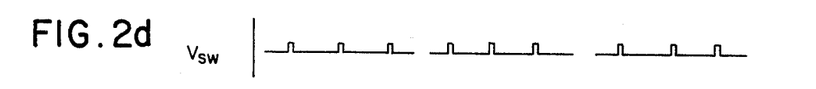

Because the transformer windings are in opposite directions, the polarity of the voltage across the primary winding 14 is opposite the polarity of the voltage across the secondary winding 18. When battery current flows in the primary winding 14 so that a voltage is developed across the primary winding 14, the polarity of the voltage across the secondary winding 16 is such that the diode 26 is biased in the reverse direction. Therefore, when the current $I_P$ flows, there is no current, $I_S$, in the secondary winding 16, as shown in FIG. 2(c).

When the current $I_P$ flows through the primary winding 14, the flux in the core of the transformer 12 builds in proportion to this current. When the voltage-sensing circuit 30 causes the bistable control circuit 32 to turn the power-switching transistor 18 OFF, the current $I_P$ is abruptly terminated. The transformer's magnetic field collapses, in response to the interrupting of $I_P$, and the voltage across the transformer windings reverse in polarity. When the voltage across the secondary winding 16 reaches a level so that the diode 26 is forwardly biased, current $I_S$ begins to flow to charge the capacitor 27. The current $I_S$ decreases with time. The transformer's magnetic field is proportional to winding current both as the field builds and as the field collapses. Therefore, the magnetic field decreases as the current $I_S$ flows. In this manner, energy stored in the transformer 12 when the transistor 18 is ON is transferred to the load capacitor 27 when the transistor 18 is OFF.

When the current $I_S$ starts to flow it has a peak or maximum value that is proportional to the magnetic field in the transformer 12. Accordingly, the maximum value of $I_S$ is proportional to the value of $I_P$ when the transistor 18 turns OFF. The current $I_S$ decreases exponentially with time. For short time intervals, it can be assumed that $I_S$ decreases approximately linearly with time, as shown in FIG. 2(c).

Figure 2E:
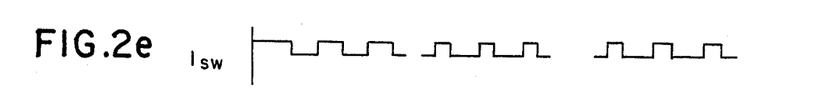

When $I_S$ decreases to a predetermined percentage of its maximum value, a current-sensing circuit 38 produces a voltage pulse $I_{SW}$, shown in FIG. 1 and in FIG. 2(e). The control circuit 32 receives the pulse $I_{SW}$ and, in response thereto, switches the transistor 18 back into its ON state, thereby terminating the energy transfer cycle and initiating the next energy storage cycle. The operation of the converter 10 is thus repeated.

Because the current $I_S$ is permitted to decrease only partially, only a partial decrease in the transformer's magnetic field occurs. Accordingly, when the next energy storage cycle commences, the primary winding current $I_P$ is non-zero. This initial non-zero primary current can be seen in FIG. 2(b) for all energy storage cycles after the first cycle.

The energy storage cycle and energy transfer cycle proceed sequentially. During each energy storage cycle, energy is drawn from the battery 20 and stored in the transformer 12. During each energy transfer cycle, energy is transferred from the transistor 12 to the capacitor 27 where the energy is stored in the form of a voltage. The voltage across the capacitor 27 therefore increases in a stepwise manner with each period of the converter 10. When the capacitor voltage reaches a predetermined level, a voltage monitor circuit (not shown), coupled between the capacitor 27 and the transistor 18, can turn the converter OFF.

Apparatus constituting the invention controls the converter 10 dynamically as a function of the condition of the battery. This arrangement provides an optimum compromise between the performance of the battery 20 and the performance of the converter 10.

In order to understand how apparatus constituting the invention provides for such an optimum compromise, a fundamental principle of electronics should be understood. That electronics principle is that maximum power transfer occurs from a battery to its load when the battery internal impedance equals or is matched to the impedance of the battery load. When this condition exists, the power delivered to the load equals the power dissipated in the battery internal impedance.

Relating the principle of maximum power transfer to the apparatus of FIG. 1, the power delivered to the converter 10 equals the power dissipated in the battery internal resistance 24 when the voltage across the converter equals the voltage drop due to the battery internal resistance. Because the battery load voltage, i.e. the voltage across the converter 10, equals the battery open-circuit voltage 22 minus the voltage drop in the battery 20 due to its internal resistance 24, maximum power is transferred to the converter 10 when the battery load voltage equals one-half the battery open-circuit voltage 22.

To operate the converter 10 for maximum power transfer requires that the current $I_P$ be constant during each energy storage cycle, and equal to one-half the battery short-circuit current. However, to operate the converter 10 so that the current $I_P$ is relatively constant whenever it flows requires that the magnetic field of the transformer 12 is, likewise, relatively constant. For a relatively constant magnetic field, both the energy storage cycle and the energy transfer cycle would have to be of an extremely short duration so that increases and decreases in the magnetic field, respectively, are small. However, as the frequency of operation of the converter 10 increases, frequency-dependent factors such as transition losses in the transformer core and the internal capacitance of the power-switching transistor 18 can cause degradation in the performance of the converter 10.

Figure 3:
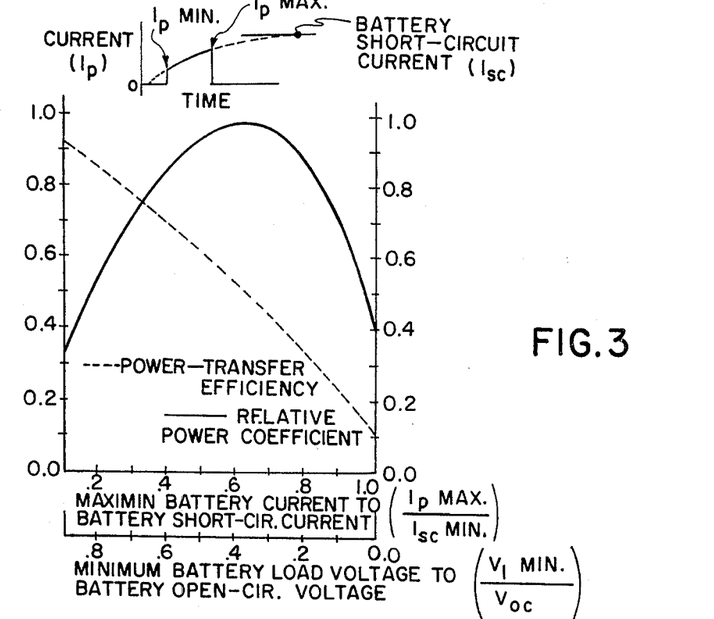
FIGS. 3 and 4 illustrate performance of the DC to DC converter of FIG. 1 as a function of the load the converter places on its energizing battery.
Figure 4:
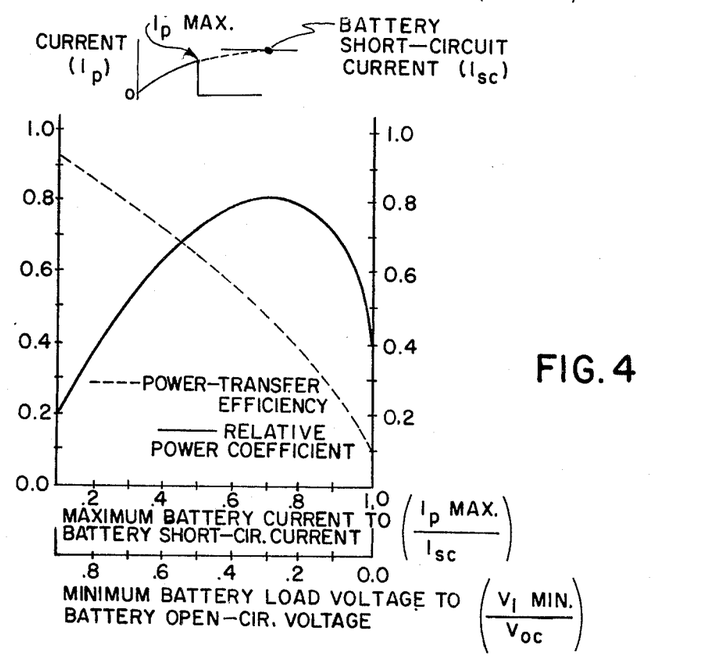

FIGS. 3 and 4 illustrate performance of the converter 10 when it is operated other than for maximum power transfer. In other words, the converter 10 is operated such that the current $I_P$ is not a constant equal to one-half the battery short-circuit current.

FIG. 3 illustrates converter performance when the current $I_P$ has a generally trapezoidal shape, as is shown in the FIG. 3, and FIG. 4 illustrates converter performance when $I_P$ has a generally triangular shape, as shown in FIG. 4. In the case of FIG. 3, the maximum value of $I_P$ is two times the minimum value of $I_P$.

In both Figs., converter performance is illustrated both in terms of power-transfer efficiency and relative power coefficient, as a function of the load the converter 10 places on the battery 20. The load the converter 10 places on the battery 20 is represented in terms of both the ratio of the maximum value of $I_P$ ($I_{P\ MAX}$) to the battery short-circuit current ($I_{SC}$), and the ratio of the minimum battery load voltage ($V_{L\ MIN}$) to the battery open-circuit voltage ($V_{OC}$). These two ratios are equivalent.

The term "power-transfer efficiency" as used herein shall mean and refer to the ratio of (1) the power delivered from the battery 20 to the converter 10, to (2) the total power supplied by the battery, which is the power dissipated in the battery internal resistance 24 plus the power delivered to the converter. For example, if power were to be transferred from the battery 20 to the converter 10 under maximum power transfer conditions, it would be transferred at 50 percent efficiency.

The term "relative power coefficient" as used herein shall mean and refer to the ratio of (1) the power delivered by the battery 20 to the converter 10, to (2) the power that would be delivered by the battery 20 to the converter if it were operated under maximum power transfer conditions.

Referring to FIG. 3, when the current $I_P$ is trapezoidal shaped, as shown, peak power is transferred when the maximum value of the current $I_P$ is approximately sixty-two percent of the battery short-circuit current. In other words, peak power transfer occurs when the battery load voltage decreases to approximately thirty-eight percent of the battery open-circuit voltage 22. For that condition, the power-transfer efficiency is approximately fifty-one percent, and the power transferred is approximately ninety-seven percent of the power that would be transferred under maximum power transfer or matched load conditions.

Referring now to FIG. 4, when the current $I_P$ is triangular shaped, the battery load voltage must decrease to approximately twenty-seven percent of the battery open-circuit 22, for peak power transfer. For that condition, the power-transfer efficiency would be about forty-six percent, and the power transferred to the converter 10 would be about eighty-one percent of the power that would be transferred under maximum power transfer or matched load conditions.

Greater power is transferred from the battery to the converter 10 when the current $I_P$ is as shown in FIG. 3 than when the current $I_P$ is as shown in FIG. 4. This is to be expected because when the current $I_P$ is generally trapezoidal shaped, as shown in FIG. 3, it more closely approximates the constant current required for maximum power transfer than does the current illustrated in FIG. 4.

For a given maximum level of the current $I_P$, the power-transfer efficiency is slightly greater when the current $I_P$ is as shown in FIG. 4 than when it is as shown in FIG. 3. However, overall, less total power is being transferred to the converter 10 when the current $I_P$ is as shown in FIG. 4 than when the current is as shown in FIG. 3.

The time to charge the energy-storage capacitor 27 is inversely proportional to the relative power coefficient shown in FIGS. 3 and 4. Accordingly, for a given ratio of minimum battery load voltage to battery open-circuit voltage (or peak battery current to battery short-circuit current) the capacitor 27 can be charged to a given level in a shorter period of time when the current $I_P$ is as shown in FIG. 3 than when the current $I_P$ is as shown in FIG. 4.

By allowing the magnetic field of the transformer 12 to collapse only partially during each energy transfer cycle, the current $I_P$ is non-zero, at the commencement of each energy storage cycle as is shown in FIG. 2(b) and FIG. 3. If the magnetic field were permitted to collapse completely during each energy transfer cycle, the initial value of current $I_P$ would be zero, as shown in FIG. 4. In other words, by allowing the magnetic field to collapse only partially, the capacitor 27 can be charged in a shorter interval of time than if the magnetic field were permitted to collapse completely.

As described previously, the total energy-delivery capacity of a battery is a function of its load. Even though battery power is constant, for example, battery voltage is halved and battery current is doubled, the battery's total energy-delivery capacity can be increased if the battery supplies lower current. However, as the converter 10 draws less battery current, the time required to charge the capacitor 27 can increase. This can be seen by referring to either FIG. 3 or FIG. 4. As the converter 10 draws a smaller maximum current, the ratio of the minimum battery load voltage to the battery open-circuit voltage 22 increases. For example, referring specifically to FIG. 3, if the converter 10 draws a maximum current $I_P$ that is less than the maximum current required for peak power transfer, the relative power coefficient decreases, thereby increasing the time required to charge the capacitor 27.

However, an increase in the capacitor charging interval can be offset to a greater or lesser extent depending on how much additional battery energy-delivery capacity is acquired as a result of the decreased load on the battery. In other words, reasonable increases in the charging intervals can be tolerated particularly if greater operational use of the battery is obtained.

When the battery 20 is a 6-volt alkaline battery and the converter 10 is used to charge an energy-storage capacitor for firing an electronic strobe flash unit, I have found that an optimum compromise between the performance of the battery and the performance of the converter is achieved (1) by allowing the battery load voltage to decrease to only approximately eighty-eight percent of the battery open-circuit voltage 22, and (2) by allowing the current $I_S$ to decrease to only approximately one-third to one-half of its maximum value. For example, I have found that by operating the converter 10 in this manner the 6-volt battery and the converter operate to successfully charge the capacitor 27 to 300 volts at least eighty times, each in an interval that does not exceed thirty seconds. On the other hand, if the converter 10 is operated so that the maximum value of the battery load voltage is allowed to decrease to sixty-five percent of the battery open-circuit voltage (operation of the current $I_S$ remains the same), the capacitor 27 can be changed only nineteen times, before the charging intervals exceed thirty seconds. The degradation in the performances of the battery 20 and the converter 10 is not as severe as the decrease in the battery load voltage is made to approach the aforementioned eighty-eight percent point.

By controlling the converter so that the battery load voltage is allowed to decrease only to eighty-eight percent of the battery open-circuit voltage, the converter 10 is operated at a point different from either the point at which maximum power transfer occurs under matched load conditions or the point at which peak power transfer occurs in the case when the current $I_P$ has a trapezoidal shape. However, in doing so, the load on the battery 20 is reduced. This extends the operational life of the battery so that it can charge the capacitor 27 a greater number of times within charging intervals of reasonable durations. It is within this set of conditions that the aforementioned optimum performance compromise is achieved.

By terminating each energy storage cycle when the battery load voltage bears a predetermined relationship to the battery open-circuit voltage 22, converter 10 is controlled dynamically as a function of battery condition. As the battery condition changes such as due to aging or environment, the battery internal resistance 24 can increase. If the resistance 24 increases, for a given battery open-circuit voltage 22, the current $I_P$, at which the battery load voltage equals a predetermined percentage of the battery open-circuit voltage 22, decreases. Therefore, as the battery internal resistance 24 increases, the converter 10 places a lighter load onto the battery 20, and less energy is drawn from the battery during each energy storage cycle.

This effect can be seen in FIGS. 2(a) and 2(b) which illustrate battery terminal voltage and the current $I_P$, respectively, when the battery internal resistance 24 has a first value during the time interval $T_0$ to $T_1$ and a second larger value during the interval $T_2$ to $T_3$. Because of the larger value of the battery internal resistance 24 during the interval $T_2$ to $T_3$, the battery load voltage decreases at a faster rate. Therefore, a smaller value of $I_P$ causes the battery load voltage to decrease to a predetermined percentage of the battery open-circuit voltage 22 than is required during the interval $T_0$ to $T_1$.

When the battery internal resistance 24 increases, the L/R time constant of the primary winding circuit decreases thereby causing the current $I_P$ to rise at a faster rate. This effect combined with the fact that the current $I_P$ must increase a lesser extent to cause the transistor 18 to turn OFF, decreases the duration of an energy storage cycle. Therefore, the frequency of operation of the converter 10 is caused to increase with increases in the resistance 24. This frequency change is acceptable as long as the frequency does not become so great that frequency-dependent losses begin to significantly degrade performance. For example, I have found using a 6-volt alkaline battery that when the minimum battery load voltage is permitted to decrease to only about ninety-one percent of the battery open-circuit voltage, the interval for charging the capacitor 27 increases significantly, and the number of times that the capacitor can be charged decreases, before the battery is exhausted.

As the battery condition changes, the battery open-circuit voltage 22 can change. If the battery open-circuit voltage 22 decreases, for a given battery internal resistance 24, the current $I_P$, at which the battery load voltage equals a fixed percentage of the open-circuit voltage 22, decreases. Therefore, as the battery open-circuit voltage 22 decreases, the converter 10 loads the battery 20 less severely, and less energy is drawn from the battery during each energy storage cycle.

This effect can be seen in FIGS. 2(a) and 2(b), which illustrate the battery terminal voltage and the current $I_P$, respectively, when the battery open-circuit voltage 22 has a value $E_1$ during the time interval $T_2$ to $T_3$, and a smaller value $E_2$ during the time interval $T_4$ to $T_5$. Because of the smaller value of the battery open-circuit voltage 22 during the time interval $T_4$ to $T_5$, a smaller value of current $I_P$ causes the battery load voltage to decrease to a fixed percent of the battery open-circuit voltage 22 than is required during the interval $T_2$ to $T_3$.

The peak value of the current $I_S$ is directly proportional to the peak value of $I_P$. Because the current $I_S$ is interrupted when it decreases to a predetermined percentage of its peak value, for a given battery open-circuit voltage 22, the minimum value of the current $I_S$ is lower as the battery internal resistance 24 increases. Likewise, for a given battery internal resistance 24, the minimum value of the current $I_S$ is lower as the battery open-circuit voltage 22 decreases.

These effects can be seen in FIGS. 2(b) and 2(c), which illustrate the currents $I_P$ and $I_S$, respectively. Because the resistance 24 is greater during the intervals $T_2$ to $T_3$ than during the interval $T_0$ to $T_1$, the current $I_S$ decreases to a lower value in the former interval. Likewise, because the open-circuit voltage 22 is lower during the interval $T_4$ to $T_5$ than during the interval $T_2$ to $T_3$, the minimum value of $I_S$ is lower during the interval $T_4$ to $T_5$ than it is in the interval $T_2$ to $T_3$.

The FIGS. 2(b) and 2(c) also illustrate that the minimum value of the current $I_P$ is directly proportional to the minimum value of $I_S$, and the maximum value of $I_S$ is proportional to the maximum value of $I_P$.

Figure 5:
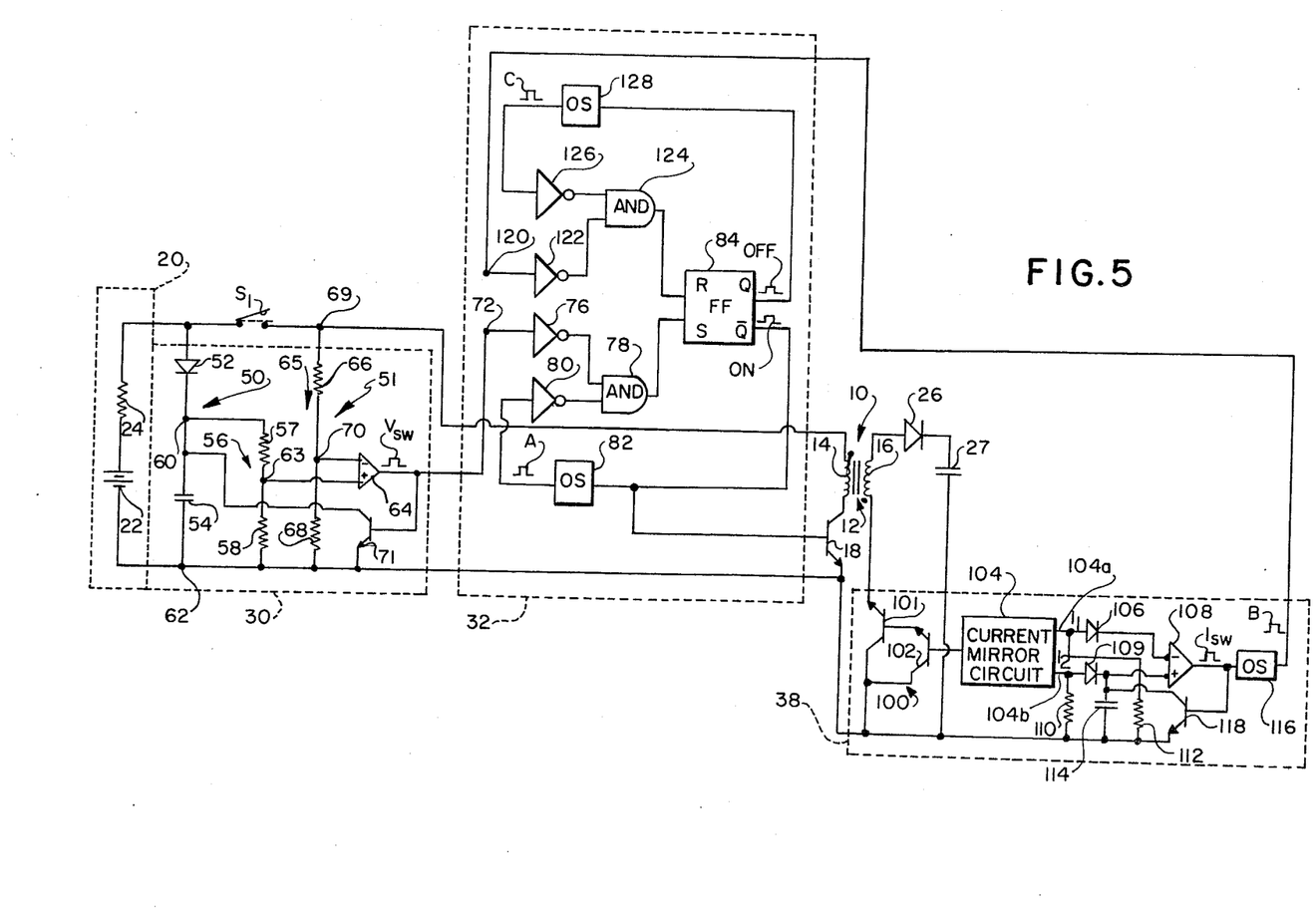
FIG. 5 is a circuit diagram of the DC to DC converter of FIG. 1.

A schematic circuit diagram of the circuitry of FIG. 1 is illustrated in FIG. 5. Components and circuits shown in FIG. 5 which correspond to components and circuits, respectively, shown in FIG. 1 are identified by like reference numerals.

The voltage-sensing circuit 30 includes circuitry 50 for producing a reference voltage corresponding to the battery open-circuit voltage 22, and a circuit 51 for sensing the instantaneous value of the battery load voltage when battery current $I_P$ is supplied to the converter 10.

The voltage-sensing circuit 30 is arranged to produce the output pulse $V_{SW}$ to terminate an energy storage cycle when the battery load voltage decreases to approximately eighty-eight percent of the battery open-circuit voltage 22, for the immediately preceding energy transfer cycle.

Accordingly, circuitry 50 is arranged to provide a reference voltage during an energy storage cycle that corresponds to the battery open-circuit voltage 22 for the preceding energy transfer cycle. To produce this reference voltage, a diode 52 is connected in series to a voltage-storage capacitor 54, the diode and the capacitor being parallel to the battery 20. A voltage divider 56, which consists of serially connected resistors 57 and 58, is connected parallel to the capacitor 54 between a terminal 60 and ground 62.

The capacitor 54 charges to a voltage corresponding to the battery open-circuit voltage 22. The voltage divider 56 and the capacitor 54 form an RC circuit. The time constant of this RC circuit is selected so that the capacitor 54 does not discharge significantly through the voltage divider 56 during an energy storage cycle, when the battery load voltage decreases below the battery open-circuit voltage 22. The diode 52 prevents the capacitor 54 from discharging into either the battery 20 and/or the converter 10 when the battery load voltage decreases below the voltage across the capacitor during an energy storage cycle.

The voltage divider 56 provides a reference voltage, at the terminal 63, that corresponds to the battery open-circuit voltage 22.

The voltage-sensing circuit 30 also includes a voltage comparator circuit 64 and a voltage divider 65. The voltage divider 65 consists of resistors 66 and 68, connected in series between a terminal 69 and ground 62, parallel to the battery 12. As shown in FIG. 5, the terminal 70 between the resistors 66 and 68 of the voltage divider 65 is connected to the inverting input terminal of the voltage comparator circuit 64 and the terminal 63 of the voltage-divider 56 is connected to the non-inverting input terminal of the comparator 64.

The voltage divider 65 provides a voltage at the terminal 70 corresponding to the instantaneous value of the battery load voltage. The voltage divider 65 and the voltage divider 56 are arranged with respect to each other so that the voltage at the terminal 70 is greater than the reference voltage at the terminal 63 when the battery load voltage is greater than eighty-eight percent of the battery open-circuit voltage 22, and the voltage at the terminal 70 equals the voltage at the terminal 63 when the battery load voltage decreases to eighty-eight percent of the battery open-circuit voltage.

When the switch $S_1$ is closed, the voltage comparator circuit 64 is arranged to produce the voltage pulse, $V_{SW}$, when the voltage at the terminal 70 decreases to or below the voltage at the terminal 63, and to remove the pulse $V_{SW}$ when the voltage at the terminal 70 is greater than the voltage at the terminal 63.

The base electrode of an NPN transistor 71 and an input terminal 72 of the bistable circuit 32 are connected to the output terminal of the voltage comparator circuit 64, as shown. When the voltage comparator circuit 64 produces its output voltage pulse, $V_{SW}$, the transistor 71 conducts, thereby causing the capacitor 54 to discharge its voltage, corresponding to the battery open-circuit voltage 22, through the transistor to ground 62.

When the input terminal 72 receives the signal $V_{SW}$, an inverter 76 produces a logic 0 output signal, which is received at one input terminal of a conventional dual-input AND gate 78.

Figure 2F:
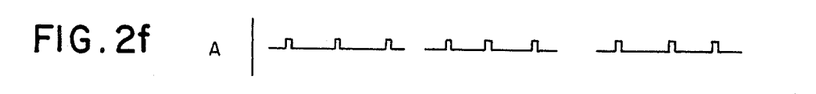

The other input terminal of the AND gate 78 is connected to an output terminal of an inverter 80. The inverter 80 is arranged to produce a logic 0 output signal when a conventional one-shot multivibrator 82 produces a positive pulse, labelled A in FIGS. 2(f) and 5.

Figure 2G:
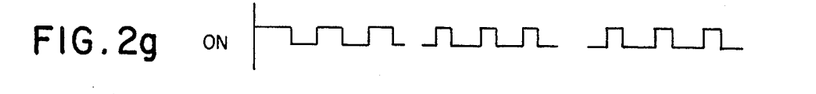

When the AND gate 78 produces a logic 0 output signal, a flip-flop 84 is set. Setting the flip-flop 84 removes a logic 1 signal, labelled ON in FIGS. 2(g) and 5, from the $\overline{Q}$ output terminal, and produces a signal, labelled OFF, on the Q output terminal.

The $\overline{Q}$ output terminal of the flip-flop 84 is connected to the input terminal of the multivibrator 82, and is connected to the base electrode of the power-switching transistor 18.

The multivibrator 82 is arranged to produce its output pulse A in response to removal of the ON signal from the $\overline{Q}$ output terminal of the flip-flop 84. As described previously, the pulse A causes the inverter 80 to produce its logic 0 signal, which thereby reinforces the setting of the flip-flop 84 caused initially by the logic 0 signal produced by the inverter 76.

At times when the ON signal is removed from the $\overline{Q}$ output terminal, the transistor 18 is switched from its conducting state into its non-conducting state. The current $I_P$, in response to the switching of the transistor 18 into its non-conducting condition, is interrupted thereby terminating an energy storage cycle and commencing an energy delivery cycle.

The current-sensing circuit 38 includes an inverted Darlington circuit 100, which consists of NPN transistors 101 and 102, connected in series between the secondary winding 16 and the input terminal of a so-called "current-mirror" circuit 104. The transistor 101, which is the output stage of the Darlington circuit 100, is connected to the secondary winding 16, and the transistor 102, which is the input stage of the Darlington circuit, is connected to the input terminal of the current-mirror circuit 104.

Because the secondary winding current, $I_S$, can be on the order of several hundred milliamperes, the Darlington circuit 100 is arranged to provide a current at the input terminal of the current-mirror circuit 104 that is approximately equal to $I_s$ divided by the product of the current gains of the transistors 101 and 102, so that the current handling capacity of the current-mirror circuit 104 is not exceeded.

The current-mirror circuit 104 is arranged to provide equal currents $I_1$ and $I_2$, at its output terminals 104a and 104b, respectively, which are proportional to $I_S$, and which flow in a direction that is opposite to the direction that $I_S$ flows. The basic construction and operation of a current-mirror circuit and its use to provide balanced current loads are well known in the art. For further descriptive details of current-mirror circuits and their uses, reference is made to U.S. Pat. No. 3,588,672 issued to G. R. Wilson on June 28, 1971, and the article entitled, The Monolithic Op Amp: A Tutorial Study by J. E. Solomon, IEEE Journal of Solid-State Circuits, Vol. SC9, No. 6, December 1974, pp. 314 through 332.

The output terminal 104a is coupled through a diode 106 to the inverting input terminal of a voltage comparator circuit 108, and the output terminal 104b is coupled through a diode 109 to the non-inverting input terminal of the comparator, as shown in FIG. 5. A resistor 110 has one terminal connected to ground 62 and the other terminal connected to the output terminal 104b of the current-mirror circuit 104. A resistor 112 is connected between ground 62 and the output terminal 104a of the circuit 104.

The resistor 110 and the resistor 112 are selected so that the resistance of the former is a predetermined fraction of the resistance of the latter. In a preferred embodiment, this fraction is one-third so that the voltage across the resistor 110 can not exceed one-third the voltage across the resistor 112 during an energy delivery cycle.

A capacitor 114 is connected between ground 62 and the non-inverting input terminal of the voltage comparator circuit 108. The capacitor 114 is arranged to provide a fixed reference voltage at the non-inverting input terminal of the comparator 108 that represents one-third of the maximum value of $I_S$ during each energy delivery cycle. To produce this reference voltage, the capacitor 114 and the resistor 110, which form an RC circuit, are selected so that the time constant of the RC circuit permits the capacitor to charge rapidly once $I_S$ commences to flow during each energy delivery cycle.

Because $I_S$ decreases continuously throughout each energy transfer cycle, at some point in time during each such cycle the instantaneous voltage across the resistor 110 will be less than the voltage across the capacitor 114. The diode 109 is arranged to prevent the capacitor 114 from discharging through the resistor 110 when this occurs.

The diode 106 and the resistor 112 provide a time-varying voltage at the inverting input terminal of the voltage comparator circuit 108 that represents the instantaneous value of $I_S$. The diode 106 and the resistor 112 are arranged with respect to the resistor 110, the diode 109, and the capacitor 114 so that the voltage at the inverting input terminal of the voltage comparator circuit 108 is greater than the reference voltage at the non-inverting input terminal of the comparator when the instantaneous value of $I_S$ is greater than one-third the maximum value of $I_S$, and the voltage at the inverting input terminal equals the voltage at the non-inverting input terminal when the instantaneous value of $I_S$ decreases to one-third the maximum value of $I_S$.

The voltage comparator circuit 108 is arranged to produce an output voltage pulse, $I_{SW}$, when the voltage at its inverting input terminal decreases to or below the voltage at its non-inverting input terminal, and to remove the pulse $I_{SW}$ when the voltage at its inverting input terminal is greater than the voltage at its non-inverting input terminal.

A one-shot multivibrator 116 and the base electrode of an NPN transistor 118 are connected to the output terminal of the comparator circuit 108, as shown. When the voltage comparator circuit 108 produces its output voltage pulse, $I_{SW}$, the transistor 118 conducts, thereby causing the capacitor 114 to discharge through the transistor 118 to ground 62.

Figure 2H:
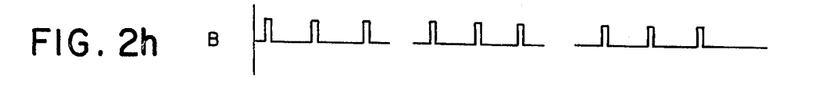

The multivibrator 116 is arranged to produce a positive output pulse, labelled B in FIG. 2(h) and FIG. 5 of the drawings, in response to the voltage pulse $I_{SW}$. The output terminal of the multivibrator 116 is connected to a second input terminal 120 of the control circuit 32, which receives the pulse B.

When the input terminal 120 receives the pulse B, an inverter 122 produces a logic 0 output signal, which is received at one input terminal of a conventional dual-input AND gate 124. The other input terminal of the AND gate 124 is connected to an output terminal of an inverter 126.

Figure 2I:
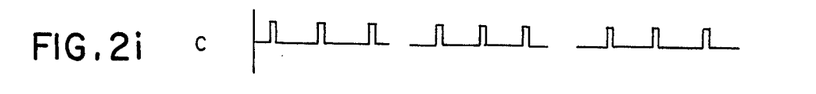

The inverter 126 is arranged to produce a logic 0 output signal when a conventional one-shot multivibrator 128 produces a positive pulse, labelled C in FIG. 2(i) and FIG. 5 of the drawings.

Figure 2J:
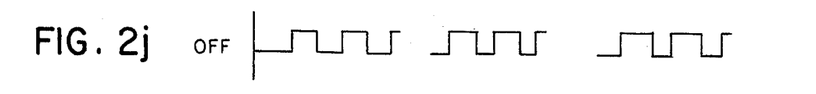

When the AND gate 124 produces a logic 0 output signal, the flip-flop 84 is reset. Resetting the flip-flop 84 removes a logic 1 signal, labelled OFF in FIG. 2(j) and FIG. 5, from the Q output terminal of the flip-flop, and restores the signal ON to the $\bar{Q}$ output terminal.

The Q output terminal of the flip-flop 84 is connected to the input terminal of the multivibrator 128. The multivibrator 128 is arranged to produce its output pulse C in response to removal of the OFF signal from the Q output terminal of the flip-flop 84. As described previously, the pulse C causes the inverter 126 to produce its logic 0 signal. This signal reinforces the resetting of the flip-flop 84 caused initially by the logic 0 signal produced by the inverter 122.

At times when the OFF signal is removed from the Q output terminal and the ON signal is restored at the $\bar{Q}$ output terminal, the transistor 18 is switched from its non-conducting state into its conducting state. The current $I_S$ is interrupted thereby terminating an energy delivery cycle and commencing an energy storage cycle.

Having described the construction of the apparatus of the invention, the operation of such apparatus is next described. The assumption is made that the battery 20 is in place and the switch $S_1$ is initially open. In this condition, no current $I_P$ is drawn by the DC to DC converter 10, and the capacitor 54 is charged to a voltage corresponding to the battery open-circuit voltage 22. When the capacitor 54 is charged to the open-circuit voltage 22, no battery current is drawn through the diode 52. Accordingly, the voltage divider 56 produces a reference voltage at the terminal 63 that represents the battery open-circuit voltage 22.

When the switch $S_1$ is closed, to energize the DC to DC converter 10, the battery load voltage appears instantaneously at the terminal 70. Because of the aforementioned arrangement between the voltage divider circuit 65 and the voltage divider circuit 56, the initial voltage at the terminal 70 will be greater than the voltage at the terminal 63. Therefore, the output terminal of the voltage comparator circuit 64 is at ground potential.

Furthermore, when the switch $S_1$ is first closed, no energy has been stored in the core of the transformer 12. Therefore, no current can flow through the secondary winding 16. Accordingly, the voltage at the inverting input terminal of the voltage comparator circuit 108 can not be greater than the voltage at the non-inverting input terminal so that the positive pulse $I_{SW}$ is produced when the switch $S_1$ is first closed. As described previously, the pulse $I_{SW}$ causes the one-shot multivibrator 116 to produce the pulse B, which causes resetting of the flip-flop 84. Therefore, as also described previously, the signal ON appears at the $\bar{Q}$ output terminal of the flip-flop 84, causing the power-switching transistor 18 to conduct.

In other words, when the switch $S_1$ is first closed, current $I_P$ begins to flow through the primary winding 14 and the power-switching transistor 18 thereby commencing an energy storage cycle. The current $I_P$ increases with time, as shown in FIG. 2(b).

The transistor 18 conducts until the current $I_P$ reaches a value at which the battery load voltage is caused to decrease to eighty-eight percent of the battery open-circuit voltage 22. At that time, the voltage at the terminal 70 has decreased to the voltage at the terminal 63, thereby causing the voltage comparator circuit 64 to produce its output pulse $V_{SW}$.

In the presence of the pulse $V_{SW}$, the transistor 71 is turned ON briefly, thereby temporarily discharging the capacitor 54. When the pulse $V_{SW}$ is removed, the capacitor 54 again charges to a voltage representing the battery open-circuit voltage 22. With this arrangement, any change in the battery open-circuit voltage 22 appears during the next energy storage cycle, in the voltage across the capacitor 54.

The pulse $V_{SW}$ causes the inverter 76 to produce a logic 0 output signal so that the AND gate 78 produces a logic 0 output signal. When the latter signal occurs, the flip-flop 84 is set to remove the ON signal from the $\bar{Q}$ output terminal. In response to the removal of the ON signal, the transistor 18 switches from its conducting state into its non-conducting state, thereby interrupting the current $I_P$.

Accordingly, as described previously, a high voltage positive pulse is immediately induced across the secondary winding 16 at the anode of the diode 26. As long as the voltage at the upper terminal of the secondary winding 16 is greater than the voltage at the upper plate of the capacitor 27, the diode 26 is forwardly biased. Also, when the voltage at the lower terminal of the winding 16 is less than the voltage at the collector of the transistor 101, which is grounded, the Darlington circuit 100 is forwardly biased. When the magnetic field collapses and both the diode 26 and the Darlington circuit 100 are forwardly biased under transformer action, current $I_S$, shown in FIG. 2(c), flows through the diode 26 to charge the capacitor 27.

In response to the current $I_S$, the current-mirror circuit 104 produces its balanced output currents $I_1$ and $I_2$ at its output terminals 104a and 104b, respectively, that correspond to $I_S$. Initially, $I_S$ is a maximum, then it decreases with time, as shown in FIG. 2(c). As described previously, the reference voltage at the non-inverting input terminal of the voltage comparator 108 represents one-third of the maximum value of $I_S$. The instantaneous value of $I_S$ is represented by the time-varying voltage at the inverting input terminal of the comparator 108.

When $I_S$ decreases to one-third of its maximum value, the voltage at the inverting input terminal of the comparator 108 has decreased to the voltage at the non-inverting input terminal, thereby causing the voltage comparator circuit 108 to produce its output pulse $I_{SW}$.

In the presence of the pulse $I_{SW}$, the transistor 118 is turned ON briefly, thereby discharging the capacitor 114. At the start of the next energy transfer cycle, the capacitor 114 will again charge to a voltage representing one-third of the peak value of the current $I_S$ for that particular cycle.

The pulse $I_{SW}$ also causes the one-shot multivibrator 116 to produce the pulse B. The inverter 122 receives the pulse B and produces a logic 0 output signal. When the latter signal occurs, the AND gate 124 produces a logic 0 signal so that the flip-flop 84 is reset. Resetting the flip-flop 84 returns the ON signal to the $\overline{Q}$ output terminal. In response to the ON signal, the power-switching transistor 18 switches from its non-conducting state back into its conducting state, thereby terminating the energy transfer cycle and initiating the next energy storage cycle.

When the output terminal of the voltage comparator 64 returns to ground potential after the pulse $V_{SW}$ is produced, the transistor 71 turns OFF. When this happens, the capacitor 54 again charges to a voltage corresponding to the battery open-circuit voltage 22.

The battery open-circuit voltage 22 and the battery internal resistance 24 should remain relatively constant when the battery 20 is first used. However, as the condition of the battery 20 changes, such as due to battery aging, the battery open-circuit voltage 22 and/or the battery internal resistance 24 can change.

The apparatus constituting the invention causes the converter 10 to be operated dynamically in accordance with battery condition. The converter 10 is operated to control the amount of energy drawn from the battery 20 so that the battery is not overburdened particularly as its condition deteriorates. As described previously, if either the battery open-circuit voltage 22 were to decrease or the battery internal resistance 24 were to increase, for example, as the battery 20 ages or the battery environment changes, the battery current drawn during an energy storage cycle would be decreased. If, as in the prior art, the battery load current were interrupted solely as a function of its magnitude, and if the battery open-circuit voltage 22 were too small or the battery internal resistance 24 too large, the battery 20 would not be able to supply the load current at which current interruption is to occur. In this case, the DC to DC converter would operate very inefficiently.

The invention has been described in detail with reference to Figures; however, it will be appreciated that variations and modifications are possible which are within the spirit and scope of the invention. For example, it can readily be understood by those skilled in the art that the converter 10 can be operated to draw a somewhat different average battery current to either increase or decrease the interval required to charge the capacitor 27. For example, the converter 10 can be operated so that the current $I_P$ approaches a constant equal to one-half the battery short circuit current for maximum power transfer, thereby reducing the time required to charge the capacitor.

What is claimed is:

1. In a DC to DC converter adapted to be energized by a battery, the battery having a load voltage that varies directly as a function of its open-circuit voltage and inversely as a function of its internal resistance, said converter comprising a transformer including a first winding and a second winding, and a switch for interrupting battery current to said first winding to cause current to flow in said second winding, the improvement comprising:

(a) voltage-sensing means, coupled to the battery, for sensing (1) the battery open-circuit voltage when battery current to said first winding is interrupted, and (2) the battery load voltage when battery current flows to said first winding; and (b) voltage-comparator means, coupled to said voltage-sensing means and said switch, for comparing the battery open-circuit voltage with the battery load voltage and for causing said switch to interrupt current in said first winding when the battery load voltage is less than a predetermined percentage of the battery open-circuit voltage, whereby the energy drawn from the battery when current flows to said first winding varies in direct proportion to the open-circuit voltage and in inverse proportion to the internal resistance of the battery.

2. In a DC to DC converter adapted to be energized by a battery, the battery having a load voltage that varies with the condition of the battery, directly as a function of its open-circuit voltage and inversely as a function of its internal resistance, said converter comprising transformer means having a first winding and a second winding, and a switch, in series with said first winding and the energizing battery, for periodically interrupting battery current to said first winding to cause current to flow in said second winding, the improvement comprising:

(a) voltage-sensing means, coupled to the energizing battery, for sensing (1) the battery open-circuit voltage when battery current to said first winding is interrupted, and (2) the battery load voltage when battery current flows to said first winding; and (b) comparator means, having an input coupled to said voltage-sensing means and an output coupled to said switch, and having (1) a first state when the battery load voltage is greater than a predetermined percentage of the battery open-circuit voltage, and (2) a second state when the battery load voltage is less than said predetermined percentage of the battery open-circuit voltage, said output of said comparator means being coupled to said switch so that current is interrupted in said first winding when said comparator means is in its second state whereby the energy drawn from the battery when current flows to said first winding varies with the condition of the battery, in direct proportion to the open-circuit voltage and in inverse proportion to the internal resistance of the battery.

3. In a DC to DC converter adapted to be energized by a battery, the battery having a load voltage that varies with the condition of the battery in direct proportion to its open-circuit voltage and in inverse proportion to its internal resistance, said converter comprising transformer means having a primary winding and a secondary winding, and a switch, in series with said primary winding and the battery, for interrupting battery current in said primary winding to cause current to flow in said secondary winding, the improvement comprising:

(a) voltage-sensing means, coupled to the battery, including (1) first means for sensing the open-circuit voltage of the battery when battery current to said primary winding is interrupted, and (2) second means for sensing the battery load voltage when battery current flows in said primary winding;

(b) comparator means, responsive to said voltage-sensing means, switchable between (1) a first state when said second means senses a battery load voltage that is greater than a predetermined percentage of the battery open-circuit voltage sensed by said first means, and (2) a second state when said second means senses a battery load voltage that is less than said predetermined percentage of the battery open-circuit voltage sensed by said first means; and (c) bistable means, coupling said comparator means to said switch, for switching said switch, in response to said comparator means switching from its first state into its second state, to interrupt current in said primary winding, whereby the energy drawn from the battery when battery current flows to said primary winding varies with the condition of the battery in direct proportion to battery open-circuit voltage and in inverse proportion to battery internal resistance.

4. In a DC to DC converter adapted to be energized by a battery, the battery having a load voltage that varies with the condition of the battery in direct proportion to its open-circuit voltage and in inverse proportion to its internal resistance, said converter comprising transformer means having a primary winding and a secondary winding, and a switch, in series with said primary winding and the energizing battery, for interrupting battery current to said primary winding to cause current to flow in said secondary winding, the improvement comprising:

(a) voltage-sensing means, coupled to the battery, for sensing (1) the open-circuit voltage of the battery when battery current to said primary winding is interrupted, and (2) the battery load voltage when battery current flows to said primary winding;

(b) comparator means, coupled to said voltage-sensing means, switchable between (1) a first condition when said voltage-sensing means senses a battery load voltage that is greater than a predetermined percentage of the battery open-circuit voltage, and (2) a second condition when said voltage-sensing means senses a battery load voltage that is less than said predetermined percentage of the battery open-circuit voltage;

(c) current-sensing means, coupled to said secondary winding, for sensing current flow in said secondary winding, said current-sensing means having (1) a first condition when the secondary winding current is above a predetermined level, and (2) a second condition when the secondary winding current is below said predetermined level; and (d) bistable switching means, having an input coupled to (i) said comparator means, and (ii) said current-sensing means, and an output coupled to said switch, and having (1) a first state when said comparator means assumes its second condition, and (2) a second state when said current-sensing means assumes its second condition, said output of said bistable switching means and said switch being coupled together so that battery current is interrupted in said primary winding when said bistable means is in its first state, and battery current flows to said primary winding when said bistable means is in its second state, whereby the energy drawn from the battery when battery current flows to said primary winding varies with battery condition in direct proportion to battery open-circuit voltage and in inverse proportion to battery internal resistance.

5. In a DC to DC converter adapted to be energized by a battery, the battery having a load voltage that changes in direct proportion to the open-circuit voltage of the battery and in inverse proportion to the internal resistance of the battery, said converter comprising transformer means having a primary winding and a secondary winding, and a switch, in series with said primary winding and the battery, for interrupting battery current in said primary winding to cause current to flow in said secondary winding, the improvement comprising:

(a) first voltage-sensing means, coupled to the battery, for producing a reference signal representing the open-circuit voltage of the battery when battery current is interrupted to said primary winding;

(b) second voltage-sensing means, coupled to the energizing battery, for producing a control signal corresponding to the battery load voltage when battery current flows in said primary winding;

(c) voltage-comparator means, coupled to said first voltage-sensing means and said second voltage-sensing means, having (1) a first condition when said control signal is greater than said reference signal, and (2) a second condition when said control signal is less than said reference signal;

(d) current-sensing means, coupled to said secondary winding, for sensing current flow in said secondary winding and having (1) a first condition when the secondary winding current is above a predetermined level, and (2) a second condition when the secondary winding current is below said predetermined level; and (e) bistable switching means, having an input coupled to (i) said voltage-comparator means, and (ii) said current-sensing means, and an output coupled to said switch, and having (1) a first state in response to said voltage-comparator means assuming its second condition, and (2) a second state in response to said current-sensing means assuming its second condition, said output of said bistable switching means and said switch being coupled together so that battery current is interrupted in said primary winding when said bistable means is in its first state, and battery current flows to said primary winding when said bistable means is in its second state, whereby the energy drawn from the battery varies in direct proportion to the battery open-circuit voltage and in inverse proportion to the battery internal resistance.

6. In a battery-powered DC to DC converter adapted to receive a battery, the battery having a load voltage that varies directly with the open-circuit voltage of the battery and inversely with the internal resistance of the battery, said converter comprising transformer means having a primary winding and a secondary winding, and a switching transistor in series with said primary winding and a received battery for periodically interrupting current through said primary winding to cause current to flow through said secondary winding, the improvement comprising:

(a) voltage-sensing means, coupled to the received battery, for producing (1) a first reference signal corresponding to the battery open-circuit voltage when battery current to said primary winding is interrupted, and (2) a first control signal corresponding to the battery load voltage when battery current flows through said primary winding;

(b) first signal comparator means, coupled to said voltage-sensing means, having (1) a first condition when said first control signal is greater than a predetermined percentage of said first reference signal, and (2) a second condition when said first control signal is less than said predetermined percentage of said first reference signal;

(c) current sensing means, coupled to said secondary winding, for sensing current flow through said secondary winding, said current-sensing means producing (1) a second reference signal corresponding to the maximum current through said secondary winding, and (2) a second control signal corresponding to the instantaneous value of the current through said secondary winding;

(d) second signal comparator means, coupled to said current sensing means, having (1) a first condition when said second control signal is related to said second reference signal by a first predetermined factor, and (2) a second condition when said second control signal is related to said second reference signal by a second predetermined factor; and (e) bistable switching means, having an input coupled to (i) said first signal comparator means, and (ii) said second signal comparator means, and an output coupled to said switching transistor, and having (1) a first state when said first signal comparator means is in its second condition, and (2) a second state when said second signal comparator means is in its second condition, said output of said bistable switching means being coupled to said switching transistor so that current is interrupted through said primary winding when said bistable means is in its first state, and current flows in said primary winding when said bistable means is in its second state, whereby the energy drawn from the battery when current flows through said primary winding varies in proportion to the battery open-circuit voltage and in inverse proportion to the battery internal resistance.

* * * * *